June 19, 1923.
T. KREIPE
FLAX HARVESTING MACHINE
Filed July 7, 1921
1,459,060
5 Sheets-Sheet 1
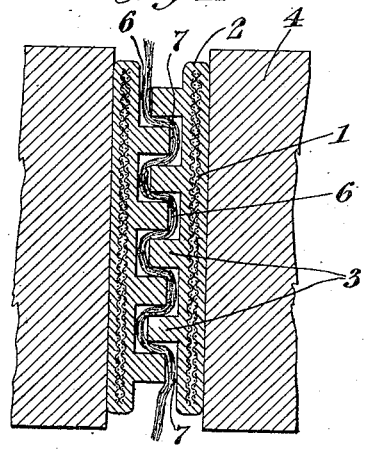
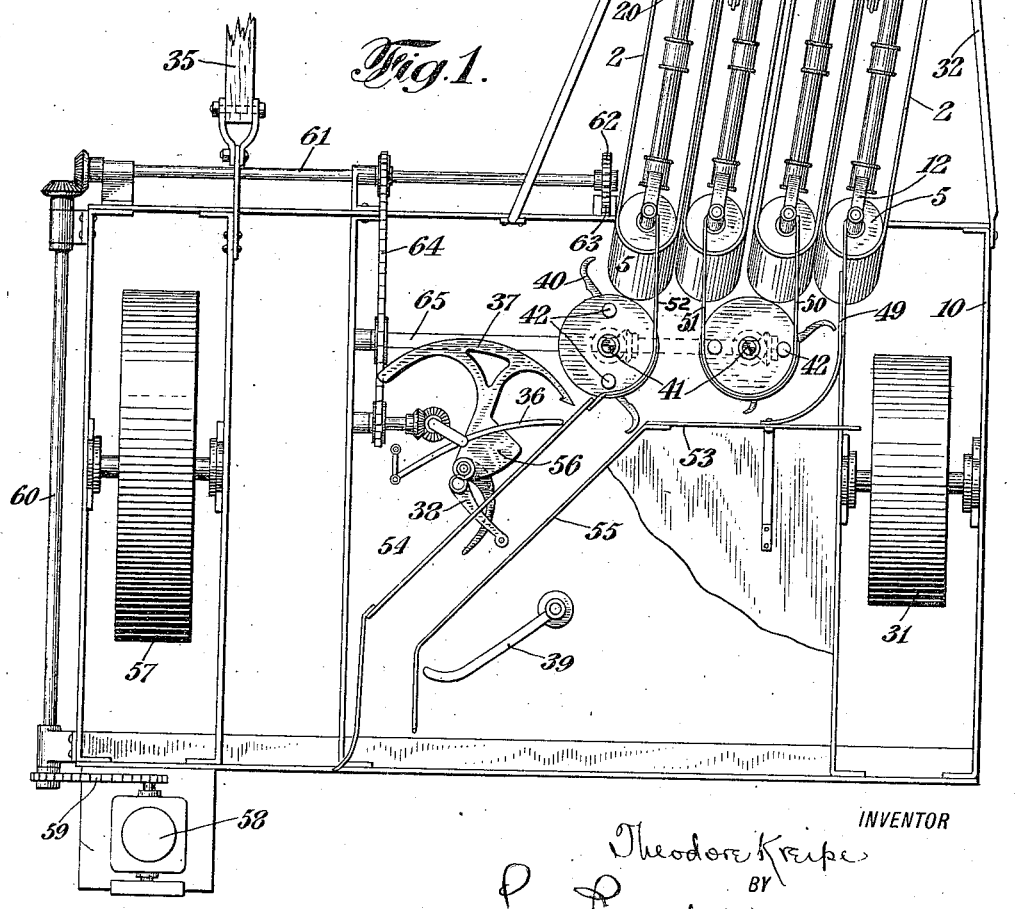
INVENTOR
Theodore Kreipe
BY
Louis Prewost Whitaker
ATTORNEY

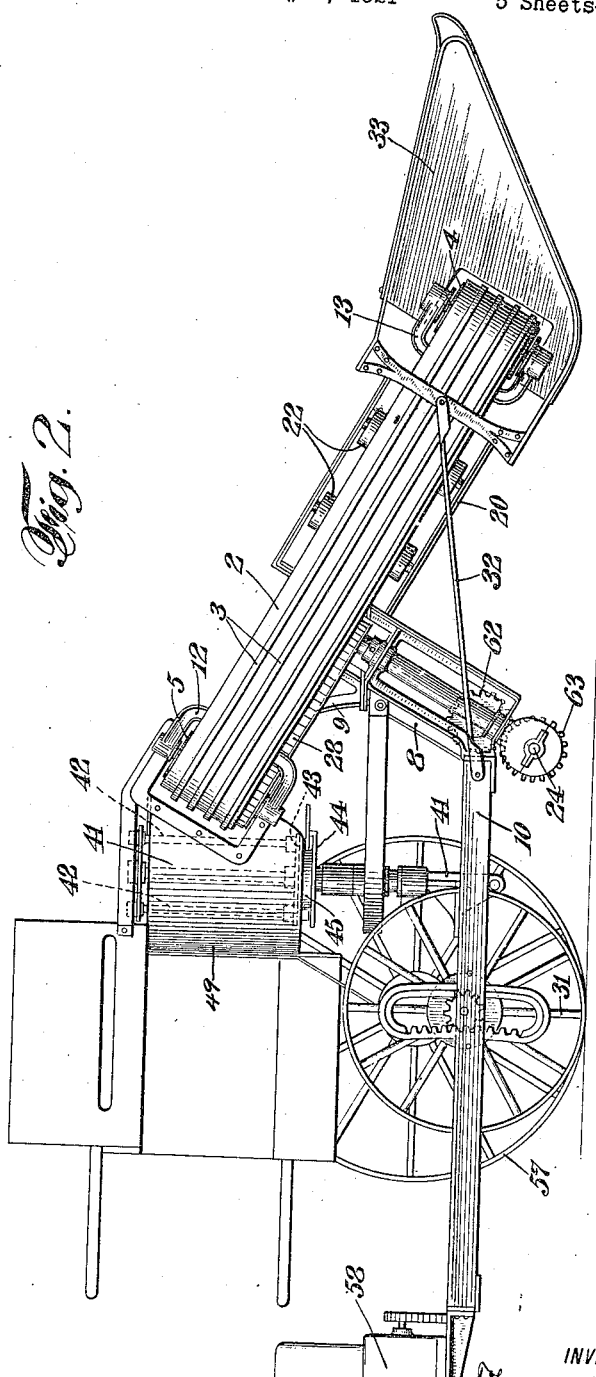

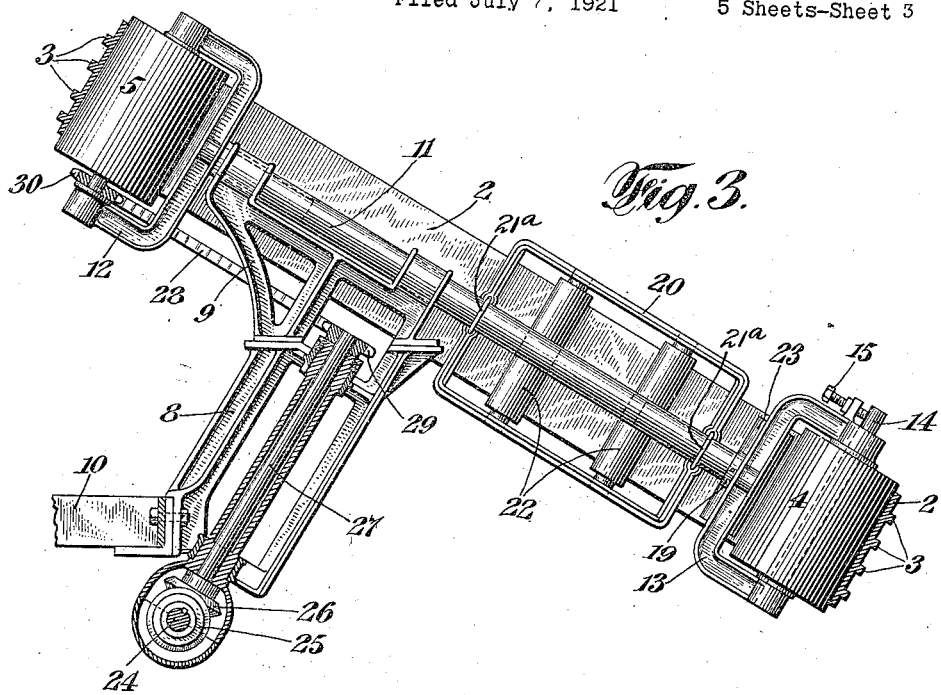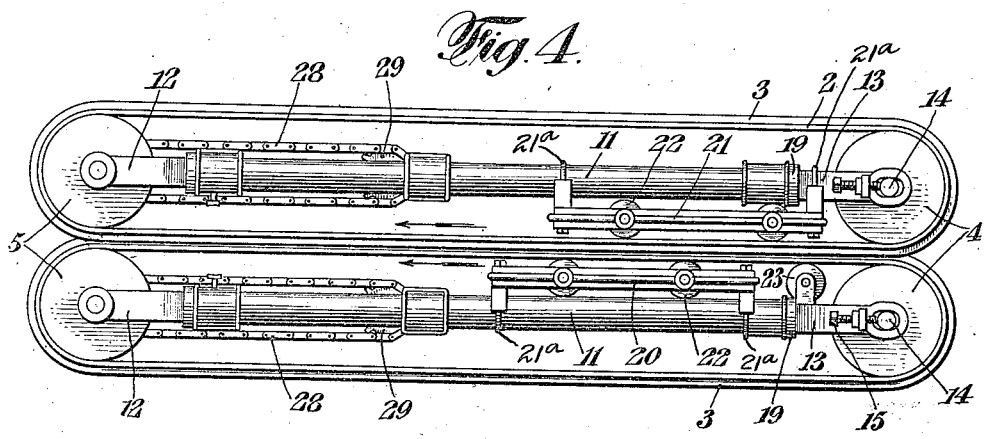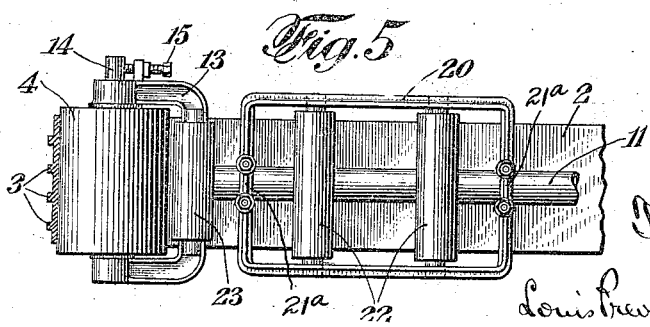

June 19, 1923.
T. KREIPE
FLAX HARVESTING MACHINE
Filed July 7, 1921
1,459,060
5 Sheets-Sheet 4
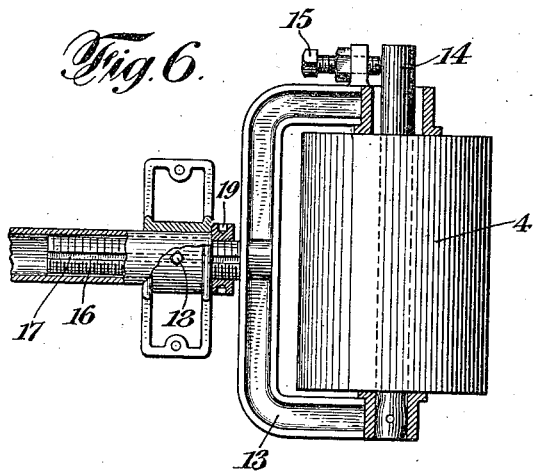
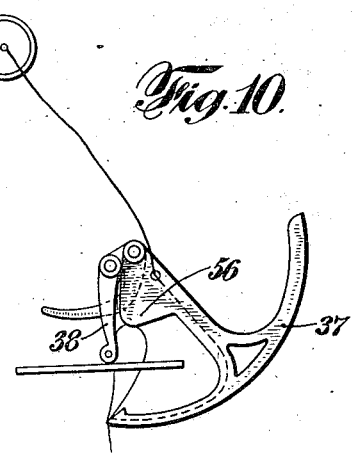
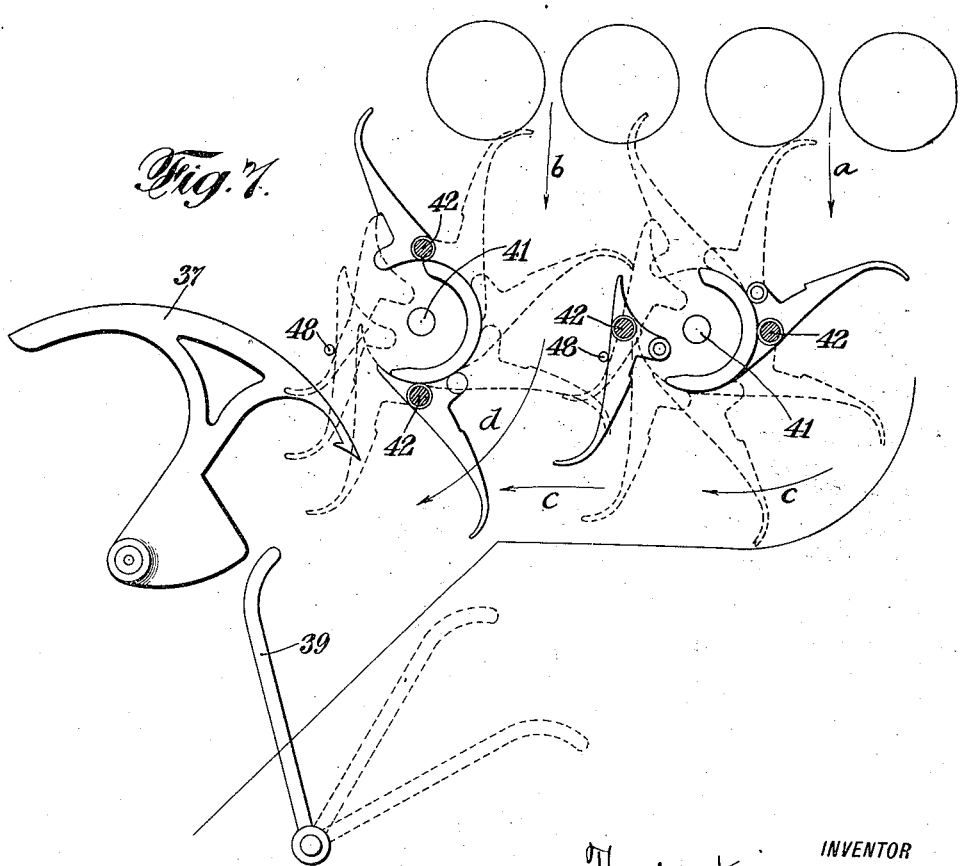
INVENTOR
Theodore Kreipe
BY
ATTORNEY June 19, 1923.
T. KREIPE
1,459,060
FLAX HARVESTING MACHINE
Filed July 7, 1921    5 Sheets-Sheet 5
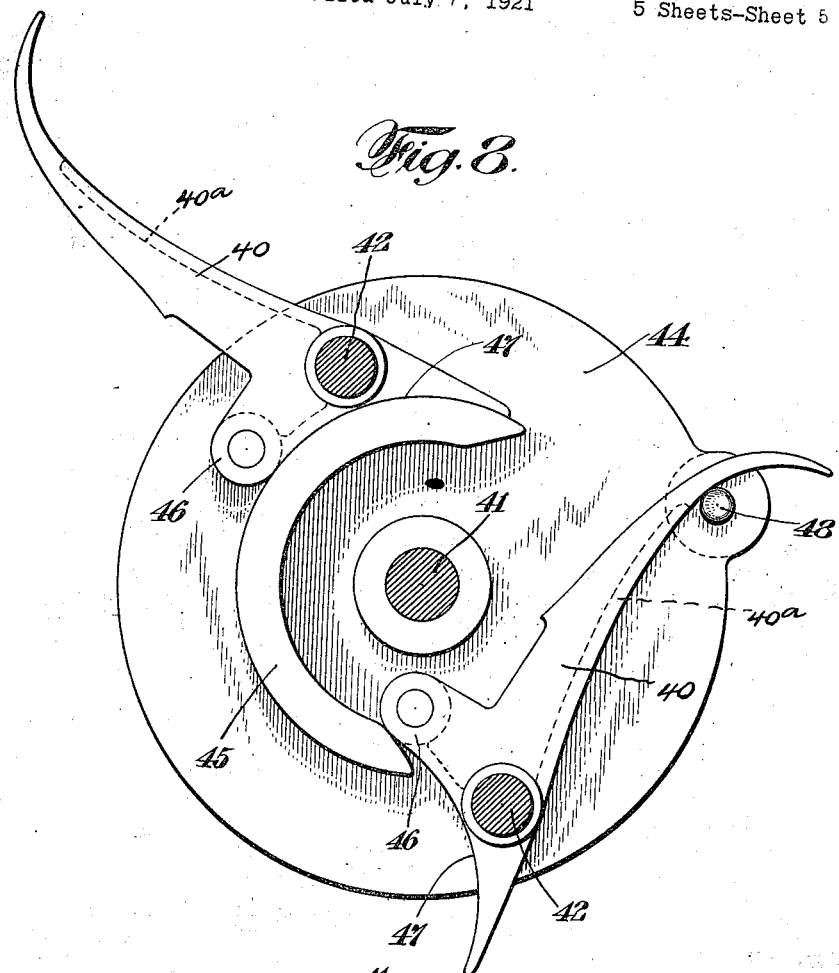
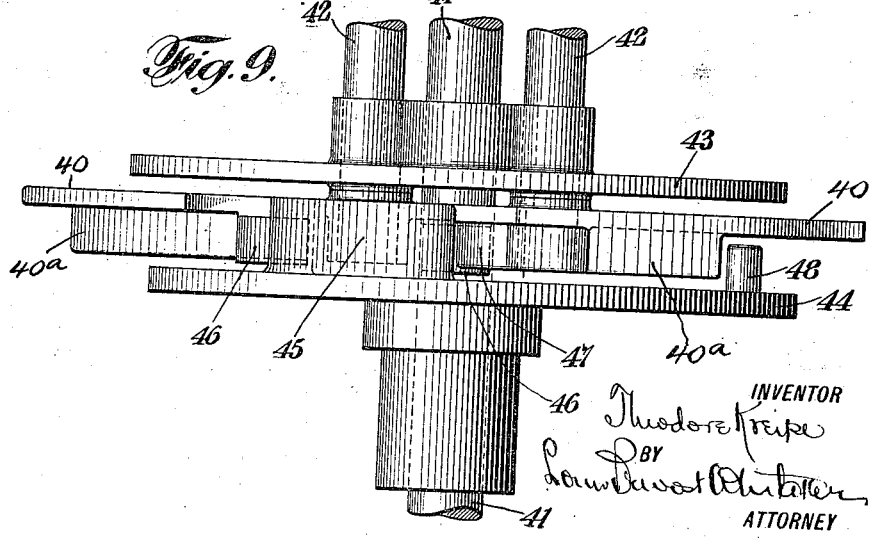
INVENTOR
Theodore Kreipe
BY
ATTORNEY Patented June 19, 1923.

1,459,060

UNITED STATES PATENT OFFICE.

THEODORE KREIPE, OF FLORAL PARK, NEW YORK, ASSIGNOR TO VICTOR E. FREEMAN AND LOUIS PREVOST WHITAKER, BOTH OF NEW YORK, N. Y.

FLAX-HARVESTING MACHINE.

Application filed July 7, 1921. Serial No. 482,874.

*To all whom it may concern:*

Be it known that I, THEODORE KREIPE, a citizen of the United States, residing at Floral Park, in the county of Nassau and State of New York, have invented certain new and useful Improvements in Flax-Harvesting Machines; and I do hereby declare the following to be a full, clear, and exact description of the invention, such as will enable others skilled in the art to which it appertains to make and use the same.

This invention consists in the novel features hereinafter described, reference being had to the accompanying drawings which illustrate one embodiment of the same selected for purposes of illustration and the said invention is fully disclosed in the following description and claims.

In the harvesting of flax, which is grown for the production of fibre, it is essential that the plants be pulled from the ground, leaving the roots integral with the stalks, as this results in facilitating the retting process for the production of the fibre and obviates the loss of fibre, which would occur if the stalks were severed above the ground. The pulling of flax has, up to the present time, been accomplished by hand labor and the scarcity and high price of hand labor at the present time is seriously interfering with the flax industry and necessitates the resorting to mechanical means for harvesting fibre flax. The pulling of flax by hand involves many serious difficulties, as it is essential that the flax stalks shall not be crushed or injured as this would result in injury to the fibre. The fact that the flax grows densely in the field like the cereal grains, but unlike them is provided at the top with branches which tend to interlock, also makes it extremely difficult to pull the flax successfully by mechanical means in the field. It is also found to be essential to such a machine that the flax plants, when pulled, shall be kept in parallelism and bound in comparatively small sized bundles to facilitate the handling of the flax through the drying, retting and deseeding processes to which it is subsequently subjected. The machine herein described has been found in actual practice to meet all these difficulties and successfully pull the flax and bind it in small bundles suitable for subsequent treatment.

In the accompanying drawings,

Fig. 1 represents a top plan view of the flax harvesting machine embodying this invention.

Fig. 2 is a side elevation of the same.

Fig. 3 is a side elevation, partly in section, of one of the pulling belts and its supporting and driving mechanism.

Fig. 4 is a top plan view of a pair of the pulling belts and their supporting and driving mechanism, constituting a pulling unit.

Fig. 5 is a detail view of a part of one of the belt supporting means.

Fig. 6 is an enlarged detail of one of the front belt supporting rollers and adjacent parts, showing the means for adjusting the tension of the belt and independent means of securing the adjustment of the roller.

Fig. 7 is a diagrammatic view illustrating a portion of the transferring reels which remove the pulled flax from the pulling units and transfer it to the binding mechanism while preserving the parallelism of the stalks.

Figs. 8 and 9 are detail views illustrating one of the transferring reels.

Fig. 10 is a detail view of a portion of the binder showing the binder arm provided with special means for producing the desired small sized bundle.

Fig. 11 is a detail sectional view showing portions of the opposed pulling belts of a pulling unit and portions of the adjacent supporting rollers carrying the same, and illustrating the intermeshing relation of the longitudinal elastic ribs of the pulling belts.

The pulling mechanism of this machine comprises one or more pulling units, each unit consisting of a pair of inclined belts having opposed vertically disposed parallel portions supported upon rollers or pulleys arranged in pairs and provided with suitable driving mechanism, each of said belts being provided on its outer face with a plurality of longitudinal ribs or beads extensible longitudinally and preferably formed of rubber so as to be longitudinally elastic, the opposed portions of a pair of these belts being illustrated in Fig. 11. The belts are preferably made of layers of canvas, balata or other suitable non-extensible fabric, indicated at 1, preferably united by rubber compound and encased in a skin of rubber, indicated at 2, one face of which is provided with the integral ribs 3 extending parallel for the entire lengths of the belts, the ribs 3 of one belt having an intermeshing relation with the ribs of the opposed belt, as shown in Fig. 11. The belts are supported upon suitable rollers at front and rear, the front rollers being indicated at 4, and the rear rollers at 5, said rollers being so supported that the opposed portions of the belts do not come together at any point and providing clearance spaces, indicated at 6, between the ribs of one belt and the face of the opposing belt, and the spaces 7 between the ribs of one belt and the ribs of the opposing belt, so that a flax stalk or stalks when gripped between the opposing ribs 3 of the belts of a pulling unit, will be given a series of bends, as indicated in Fig. 11, sufficient to enable the belts to hold the stalk or stalks frictionally against vertical movement, and pull them out of the ground together with the roots as the belts travel upwardly and rearwardly in the machine. The clearances 6 and 7 before referred to are sufficient to accommodate any number of stalks which may occupy the belt at any part thereof so that the pulling apparatus is equally effective where the flax is thinly planted or thickly planted, and as the belts do not have any parts in direct contact the flax stalks will not be crushed between opposing surfaces, but will bend and accommodate themselves within the clearances provided. The ribs 3 of the belts being made preferably of rubber can expand longitudinally as they pass around the rollers at the front and rear end and resume their normal position along the straight portions of the belt, thus making the belt flexible and easy to drive, while the elasticity of the ribs transversely also tends to avoid crushing the stalks while insuring a firm grip upon the bent portions thereof.

In the machine illustrated in the drawings two pulling units are shown, but any desired number may be employed, each unit comprising two belts such as previously described, and the rollers 4 and 5 for each belt being mounted on a frame in the manner illustrated in Figs. 3 and 4. In these figures 8 represents an inclined support secured to the main frame 10 and carrying at its upper end a bracket 9 provided with collars in which a longitudinal bar or tube 11 is held. The rear end of the bar 11 is provided with a yoke 12 carrying the rear roller 5. The front end of the bar 11, which is the lower end, is also provided with a yoke 13 carrying a pivotally mounted shaft 14 on which the front roller 4 is mounted, an adjusting screw 15 being provided to adjust the shaft 14 in parallelism with the shaft of the roller 5 so that the belt will run true. The yoke 13, as shown in Fig. 6, is provided with a threaded stem 16 slotted at 17 and held from rotation by a set screw 18 and provided with a nut 19 by which it may be adjusted to tension the belt without affecting the adjustment provided by the screw 15. For holding the opposed portions of the belts against separation, but without forcing them into contact, rectangular frames 20 and 21 provided with saddles 21ª are clamped to the bars 11 by U-bolts and are provided with rollers 22, the rollers adjacent to one belt being out of alignment with those engaging the other belt of a pair to avoid crushing the stalks, in some instances an additional roller, indicated at 23, is carried by one of the yokes 13 in order to bring it as far forward as possible.

It will be understood that the belts are driven so that the parallel opposed portions will move in the same direction as indicated by the arrows in Fig. 4. In order to avoid having anything above the pulling belts in which the branch portions of the stalks may become entangled, it is preferred to drive these belts from below, and this is accomplished preferably by means of a common driving shaft, indicated at 24, extending across the front of the machine and provided with beveled pinions 25 engaging beveled pinions 26 on vertically inclined shafts 27 mounted in the inclined supports 8, the upper ends of the vertical shafts being each connected by a sprocket chain 28 and sprocket wheels 29—30 with the rear roller 5 of one of the belts.

The desired number of pulling units, two of which are shown in Fig. 1, are provided at the front of the machine frame 10 and preferably extend at a slight outward angle therefrom to enable the grain wheel 31 to clear the standing grain, the pulling units being suitably stiffened by braces 32 and provided with forwardly extending dividers 33 and 34 for guiding the standing stalks into the grip of the pulling belts of the several units.

As the machine is drawn forward over the ground by tractor or draft animals, which may be connected to the draft tongue, indicated at 35, the dividers 33—34 will be pushed into the standing flax, separating the stalks and guiding them into the grip of the opposed belts of the several units, which are driven at substantially the same or greater speed in a rearward direction. As the stalks enter between the opposed belts they will be firmly gripped and slightly deflected in zig zag form by the opposed intermeshing ribs and as the belts move upwardly, the stalks will be raised and gradually pulled out of the ground by the roots without being injured, and will be carried to the upper ends of the pulling units and there discharged rearwardly in perfect parallelism.

Upon the frame 10 in rear of the pulling belts is located the binding mechanism which is so arranged as to bind the stalks while still in vertical and parallel relation. The binding mechanism is of usual form and comprises horizontally movable packing arms, a horizontal swinging needle arm or binder 37, a horizontally movable trip arm 38, and a horizontally movable ejector arm 39. It is very important that the stalks delivered by the pulling units shall be seized and transferred into the binder without permitting them to fall vertically or lose their parallelism. To this end one or more vertical reels provided with a plurality of disappearing arms are provided and so located that the stalks from the pulling unit nearest the binder will be immediately seized by the adjacent reel arms and carried directly into position to be engaged by the packer arms 36, the adjacent pulling units being provided with an additional reel or reels which take the stalks therefrom and deliver them to the first mentioned reel by which they are forwarded to the binder. The revolving and disappearing reel arms are moved horizontally and with sufficient rapidity to carry the stalks along and thrust them into the binder without permitting them to move downwardly with respect to the reel arms. Each of the reels comprises a vertical shaft 41 provided with one, two or more sets of horizontally revolving arms 40, as may be deemed most desirable. I prefer to employ two sets of these revolving arms for each reel, one set being located above the delivery ends of the adjacent pulling belts and the other set being located below the ends of the adjacent pulling belts, as clearly shown in Fig. 2. The revolving and disappearing arms will therefore engage the stalks at different points longitudinally thereof, and will carry them in vertical position. Being located above and below the delivery ends of the pulling belts, the stalks will be taken from the belts and carried to the binder without being permitted to fall or become tangled or otherwise get out of their vertical parallelism. These revolving arms, are pivoted at 42 to horizontal discs 43 (see Figs. 8 and 9) adjacent to each of which is a stationary disc 44 provided with a cam 45 for engaging friction rollers 46 on the pivoted arms, said arms being provided with curved guiding portions 47 adapted to pass around the exterior of the cam 45, as shown in Fig. 8, and the cam plate 44 is also provided with a stud 48 for engaging the cam flanges 40ª on the arms and causing said arms to disappear between the plates 43 and 44 after they have performed their function, as clearly indicated in Fig. 8, and as shown in the diagram Fig. 7, in order that these reels may operate without winding up or entangling the flax.

The use of these transferring reels provides an extremely simple and effective transferring mechanism for positively taking the pulled flax from the pulling units and delivering it in parallelism into the vertical binder and insuring the continued movement of the flax from the pulling units to the binder. Suitable guides indicated at 49, 50, 51, 52 and 53 are provided to insure the proper delivery of the flax into the binder, and the binder is also provided with guides 54 and 55 to control the position of the flax in passing to and from the same. It will be understood that the binder operates in the usual manner and whenever flax plants have accumulated in the binder between the pickers 36 and trip 38 to make the desired bundle, the trip will yield and effect the forward operation of the needle arm 37 to carry the twine around the stalks and in position to be tied and severed in the usual manner. In order to make the bundle small and insure its being tightly bound the needle arm is preferably provided with a cam portion, indicated at 56 in Fig. 10, which confines and limits the size of the bundle by preventing the stalks from extending in a direction toward the axis of the needle arm, and this cam portion enables the binding of the requisite small bundles with binding mechanism such as is commonly employed in the ordinary self-binding harvesters.

The main frame of the machine is carried upon a bull wheel, indicated at 57, substantially in line with the propelling tongue 35, and an outer grain wheel 31 before referred to. The apparatus may be driven from the bull wheel, but it is preferred to drive the moving parts from a motor carried on the machine, preferably an internal combustion engine, indicated at 58 by which greater steadiness and uniformity of operation can be obtained. As herein shown the motor is connected by sprocket chains 59 with a longitudinal driving shaft 60, which is connected by beveled gearing with a transverse driving shaft 61 extending across the front of the machine frame and connected by gearing 62—63 with the driving shaft 24 of the pulling units. The shaft 61 is also connected by a sprocket chain 64 and suitable sprockets with a counter shaft 65, which is connected by beveled gears with the vertical shaft 41 of the transfer rolls, and the binder is also driven from the shaft 61 in any desired way.

It will be understood that the reels hereinbefore described are located immediately in rear of the pulling units, one of said reels, the one at the right in Fig. 7, being located in rear of and slightly to the left of the right hand pulling unit in position to receive the pulled stalks therefrom, which will be delivered in the direction of the arrow, indicated at *a* in that figure. The second reels occupy a similar position in rear of and slightly to the left of the second pulling unit in position to receive the pulled stalks therefrom, which are delivered in the direction indicated by the arrow *b* in that figure. The second reel, as will be readily apparent in Fig. 7, also receives the pulled stalks from the first reel and delivers them together with those received from the second pulling unit to the binder. The directions in which the stalks are propelled by the reels are further illustrated by the arrows *c—c* and the arrow *d*. It will thus be seen that the second reel, the one at the left in Fig. 7, performs the double function of delivering the stalks received from the second pulling unit, and also the stalks from the first pulling unit transferred to it by the first reel, into the binder. It will be understood that where a greater number of pulling units are employed, a succession of reels will be similarly arranged in connection therewith so that each reel will forward the stalks received from its own pulling unit together with those which it receives from a preceding reel, to the next reel, or into the binder as the case may be. It will also be understood that each of the reel shafts 41 is provided preferably with a series of the reels illustrated in detail in Figs. 8 and 9 so that the stalks are simultaneously grasped at different elevations at two or more points according to the number of reels employed on each shaft, and these reel shafts are rotated at such a speed that the stalks are combed or swept horizontally with such rapidity that the stalks will be carried along bodily without falling vertically or changing their parallel positions. In thus sweeping the vertical stalks by the horizontal swing or movement of the reel arms engaging the stalks at several points in their length, there is sufficient frictional resistance between the stalks and the reel arms to prevent the stalks from falling vertically in their passage from one reel to the next and so on to the binder.

Obviously the reels operating in this manner would not release the stalks unless means are provided for retracting the arms, as hereinbefore described, and as specifically illustrated in Figs. 8 and 9. Thus, in Fig. 8, one of the reel arms is shown in extended position in which it is held so as to act as a rigid arm swinging on the axis of the shaft 41, by means of the engagement of the curved portion 47 with the exterior of the stationary cam 45 on the plate 44. When the rotation of the shaft 41 has carried the curved portion 47 beyond the end of the cam 45, the arm 40 will swing on its pivot 42 so as to fall backwards and practically withdraw itself lengthwise from the stalks being guided in this movement by the engagement of the cam flange 40ª which depends from each arm, and which at this point engages the stud 48 on the stationary cam plate 44. This throws the friction roller 46 toward the shaft 41 and the arm is held in retracted position until the roller 46 engages the opposite end of the fixed cam 45, at which time the cam flange 40ª which is of less length than the arm 40, has passed off of the stud 48, which position of the arm is illustrated at the right in Fig. 8. The further rotation of the shaft 41 causes the arm 40 to swing outwardly with considerable increase of feed on account of the engagement of the roller 46 with the end of the cam 45, as will be readily apparent from an examination of Fig. 8, until the curved portion 47 of the arm engages the outer face of the cam 45. In this sweep of the arm the flax stalks are rapidly taken under control by the roller arms, at two or more points in their length, as above stated, thus positively removing the stalks from the pulling units and rapidly transferring them to the next adjacent reel or unit or binder as the case may be.

I have shown the reels provided each with two arms but I do not wish to be limited to the exact number. Obviously if a greater number of arms were employed in each reel the speed of rotation can be diminished to effect the same result, but obviously the weight of the reel structure would be correspondingly increased and it would require greater power to drive it. The reels constructed as shown herein each having two arms and driven at the required speed have given excellent results in actual practice in the field.

What I claim and desire to secure by Letters Patent is:—

1. In a flax harvesting machine, the combination of a plurality of pulling mechanisms each comprising a pair of vertically disposed pulling belts having inclined parallel opposed portions, with a vertically disposed binding mechanism, and transferring mechanism comprising horizontally rotatable arms for sweeping the pulled stalks, in vertical parallel relation, from the pulling mechanisms into the binder, and means for rotating said arms at sufficient speed to carry the pulled stalks into the binder without permitting them to fall vertically.

2. In a flax harvesting machine, the combination of a plurality of pulling mechanisms each comprising a pair of vertically disposed pulling belts having inclined parallel opposed portions, with a vertically disposed binding mechanism, and transferring mechanism comprising horizontally rotatable arms for sweeping the pulled stalks, in vertical parallel relation, from the pulling mechanisms into the binder, and means for rotating said arms at sufficient speed to carry the pulled stalks into the binder without permitting them to fall vertically, and means for retracting said rotatable arms during portions of their rotary movements to withdraw them from the stalks and prevent winding.

3. In a flax harvesting machine, the combination of pulling mechanism comprising a pair of vertically disposed pulling belts having inclined parallel opposed portions, with a vertically disposed binding mechanism, and transferring mechanism comprising a plurality of sets of rotary arms having their axes located at different points between the pulling belts and the binder, and each set comprising arms located in different horizontal planes, for engaging the pulled stalks at different points in their length, and means for rotating said arms at a speed sufficient to carry them from the pulling belts into the binder without permitting them to fall vertically.

4. In a flax harvesting machine, the combination of pulling mechanism comprising a pair of vertically disposed pulling belts having inclined parallel opposed portions, with a vertically disposed binding mechanism, and transferring mechanism comprising a plurality of sets of rotary arms having their axes located at different points between the pulling belts and the binder, and each set comprising arms located above the level of the delivery ends of the pulling belts and arms located below the level of the delivery ends of said belts, for engaging the stalks at different points in their length, and means for imparting rotary motion to said arms at sufficient speed to sweep the pulled stalks in vertical parallel relation from the pulling belts into the binder without permitting them to fall vertically.

5. In a flax harvesting machine, the combination of a plurality of pulling units each comprising a pair of vertically disposed pulling belts having parallel inclined opposed portions, with a vertically disposed binding mechanism, and transferring mechanism comprising a reel provided with horizontally rotatable arms located adjacent to each of said units and an auxiliary reel located between one of the first mentioned reels and the binder, said reels having their axes so located that the stalks will be passed from one reel to another and into the binder, and means for driving said reels at sufficient speed to carry the stalks in vertical parallel relation into the binder without permitting them to fall vertically.

6. In a flax harvesting machine, the combination of a plurality of pulling units each comprising a pair of vertically disposed pulling belts having parallel inclined opposed portions, and a vertically disposed binding mechanism, and transferring mechanism comprising a reel located adjacent to the delivery end of each of said pulling units and comprising horizontally rotatable arms located above and below the delivery end of the adjacent pulling unit, said reels having their axes so located as to pass the pulled stalks from one to the other in a direction toward the binder, and an auxiliary reel interposed between one of said first mentioned reels and the binder, and having rotary arms located in different horizontal planes, for receiving the pulled stalks from all the pulling units and carrying them into the binder, and means for driving all of said reels.

7. In a flax harvesting machine, the combination with pulling units, of a transferring reel comprising among its members a vertically rotatable shaft, a rotary device carried thereby, pivotally mounted arms on said rotary device, a stationary part having a cam for controlling said arms when in operative position, and an eccentrically located stop for retracting said arms.

8. In a flax harvesting machine, the combination with pulling units, of a transferring reel comprising among its members a vertically rotatable shaft, a rotary device carried thereby, pivotally mounted arms on said rotary device, a stationary part having a cam for controlling said arms when in operative position, and an eccentrically located stop for retracting said arms, each of said arms having a curved portion for engaging said cam, and a longitudinal flange of less extent than said arms for engaging said stop.

9. In a flax harvesting machine, the combination with pulling units, of a transferring reel comprising among its members a vertically rotatable shaft, a rotary device carried thereby, pivotally mounted arms on said rotary device, a stationary part having a cam for controlling said arms when in operative position, and an eccentrically located stop for retracting said arms, each of said arms being provided with a curved segmental portion for engaging said cam, an eccentrically mounted roller for engaging said cam, and a vertically disposed flange of less length than the arm for engaging said stop, and adapted to disengage the stop at the instant of engagement of said roller with said cam.

In testimony whereof I affix my signature.

THEODORE KREIPE.